United States Patent [19]

Kumagai et al.

[11] Patent Number: 5,136,653
[45] Date of Patent: Aug. 4, 1992

[54] ACOUSTIC RECOGNITION SYSTEM USING ACCUMULATE POWER SERIES

[75] Inventors: Ryohei Kumagai; Sunao Takatori; Makoto Yamamoto, all of Tokyo, Japan

[73] Assignee: Ezel, Inc., Tokyo, Japan

[21] Appl. No.: 501,875

[22] Filed: Mar. 29, 1990

Related U.S. Application Data

[63] Continuation-in-part of Ser. No. 340,438, Apr. 19, 1989, abandoned, which is a continuation-in-part of Ser. No. 295,763, Jan. 11, 1989.

[51] Int. Cl.$^5$ .............................................. G10L 5/06
[52] U.S. Cl. .............................................. 381/43; 381/42
[58] Field of Search .............................. 381/41–47; 364/513.5

[56] References Cited

U.S. PATENT DOCUMENTS

| | | | |
|---|---|---|---|
| 4,069,393 | 1/1978 | Martin et al. | 381/43 |
| 3,925,761 | 12/1975 | Chaires et al. | 381/43 |
| 4,107,460 | 8/1978 | Grunza et al. | 381/43 |
| 4,401,851 | 8/1983 | Nitta et al. | 381/45 |
| 4,592,085 | 5/1986 | Watari et al. | 381/43 |
| 4,797,929 | 1/1989 | Gerson et al. | 381/43 |
| 4,827,519 | 5/1989 | Fujimoto et al. | 381/43 |
| 4,827,522 | 5/1989 | Matsuura et al. | 381/43 |

Primary Examiner—Dale M. Shaw
Assistant Examiner—Michelle Doerrler
Attorney, Agent, or Firm—Cushman, Darby & Cushman

[57] ABSTRACT

A recognitiion method and system for associating a pattern, such as a printed character with an acoustic signal, such as speech. A multilevel power sequence is generated from the acoustic signal, and the sequence is segmented into phonemes. The multilevel power sequence is converted into a binary level sequence to reduce noise. The binary power sequence is accumulated to give a series whose elements are partial sums of the sequence as a function of time. The accumulated sequence is differentiated to give a series whose elements are the derivatives of the accumulated sequence as a function of time. The differentiated sequence is then associated with a pattern, such as a printed character.

18 Claims, 4 Drawing Sheets

ACOUSTIC RECOGNITION SYSTEM USING ACCUMULATE POWER SERIES

This application is a continuation-in-part of U S. patent application No. 07/340,438, filed Apr. 19, 1989, now abandoned which is a continuation-in-part of U.S. application No. 07/295,763, filed Jan. 11, 1989.

FIELD OF THE INVENTION

The present invention relates to an acoustic recognition system.

BACKGROUND OF THE INVENTION

The DP matching method is the most successful method for acoustic recognition among the conventional acoustic recognition methods. A report describes that an average recognition ratio of 85% has been obtained in phoneme recognition including vowels and consonants, by the DP matching method.

The DP matching method extracts characteristics in frequency and power of the audio signal inputted. Then, the characteristics are compared with the reference phonetic pattern. The rules for the comparison are to be determined according to experimental results which are determined. Therefore, the comparison rules are applicable to the audio signals already experimented or to similar signals.

SUMMARY OF THE INVENTION

The present invention has an object to provide an acoustic recognition system having a high recognition ratio for a wide range of audio signals, without the above-described limit by the experiment or rules.

The acoustic recognition system according to the present invention comprises an input portion for generating a digital acoustic pattern in response to inputted analog audio signal; a characteristic processing portion for extracting characteristics from the digital pattern, an association portion for generating an associative pattern in response to the characteristics extracted, and a memory for storing data in an address corresponding to an associative pattern, so as to recognize acoustic signals in the manner of a neural network.

PREFERRED EMBODIMENT OF THE PRESENT INVENTION

Exemplary preferred embodiments of the present invention will be described in detail hereinafter, referring to attached drawings.

Figure 1:
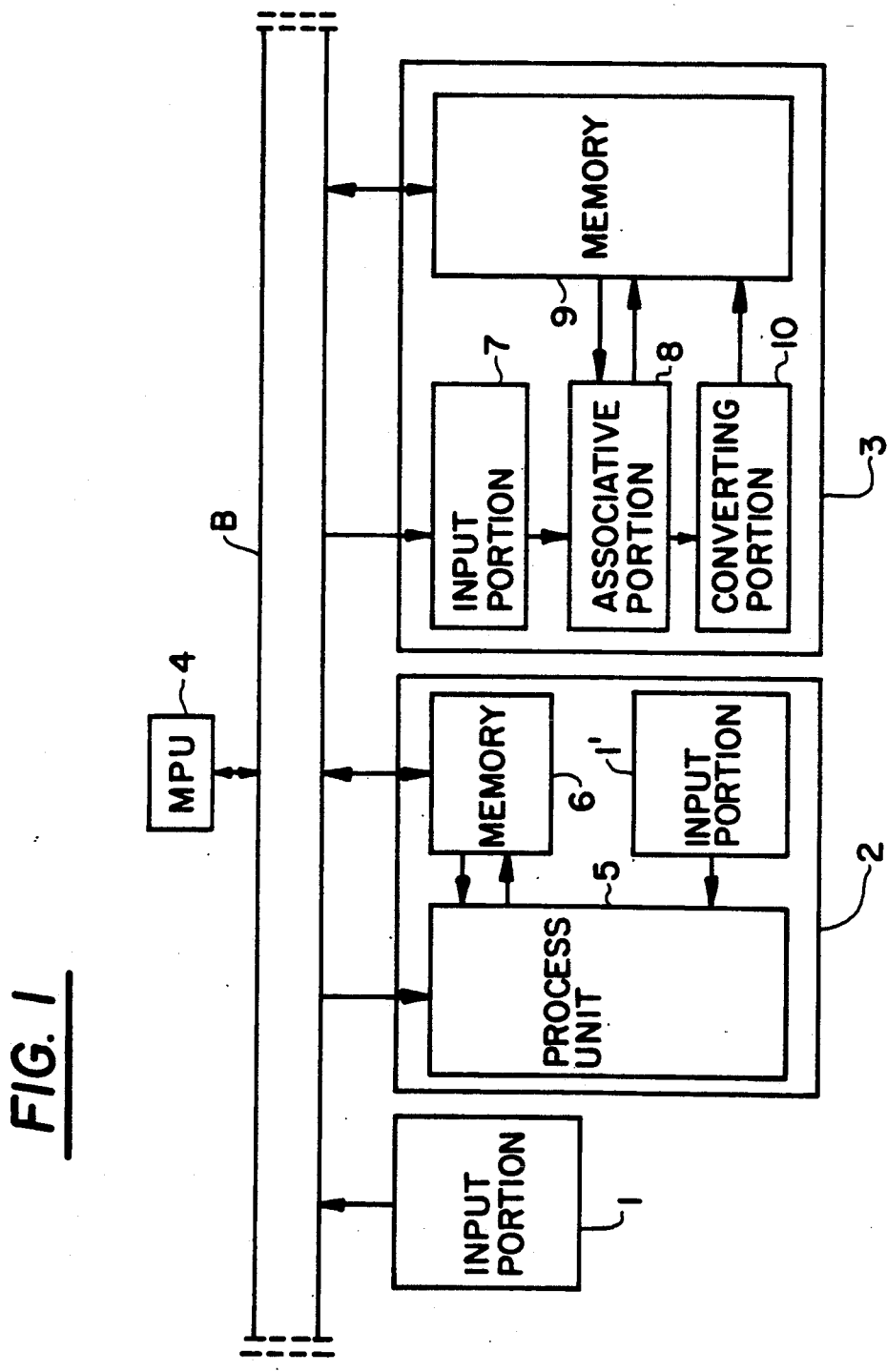
FIG. 1 is a block diagram of an embodiment of an acoustic recognition system according to the present invention.

In FIG. 1, an acoustic recognition system comprises an input portion 1 for generating a digital pattern in response to an analogue acoustic signal. A characteristic processing portion 2 is provided for extracting characteristics from the digital pattern generated from the input portion 1. The characteristics extracted by the portion 2 are processed in the recognition portion 3.

The portions 1 to 3 are connected together and with MPU 4 through a bus B. The input portion 1 includes an input device such as a microphone, as well as I/O. The I/O includes a data compression means and a memory for holding data etc., if necessary.

The characteristic processing portion 2 includes a main processing portion 5 for extracting characteristics and a memory 6 for holding a digital pattern generated from the input portion 1. An auxiliary input characteristic processing portion 1' similar to the portion 1 is also incorporated within the portion 2 for improving the process speed.

When input data is grabbed acquired by input portion 2, input data is transmitted through system bus B to MPU 4, then transmitted from MPU 4 through bus B to the portion 2. Transmission speed through system bus B is limited by the processing speed of MPU 4. The transmission speed of MPU is designed for various processing, so the speed is much slower than the processing speed of the portion 2. When input portion 1' is used, data transmission is performed through local bus LB (see FIG. 2) whose transmission speed is determined by processing speed of hardware in main processing portion 5. The processing speed of the portion 5 is much faster than that of MPU 4, because the processing manner and data to be processed are narrowly limited. Therefore, by using input portion 1', processing speed is improved.

Recognition portion 3 is an example of a "neural network", and such a neural network may be realized by software or hardware. Recognition portion 3 is a mathematically modelled neural network, comprising matrix calculation portion 22 and quantizing portion 23 (see FIG. 2).

The recognition portion 3 includes an input portion 7 to which acoustic characteristics to be recognized are inputted, an association portion 8 for associating according to the data processed by the input portion 7, and a converting portion 10 for designating an address where data is stored, corresponding to the output from the association portion 8.

Figure 2:
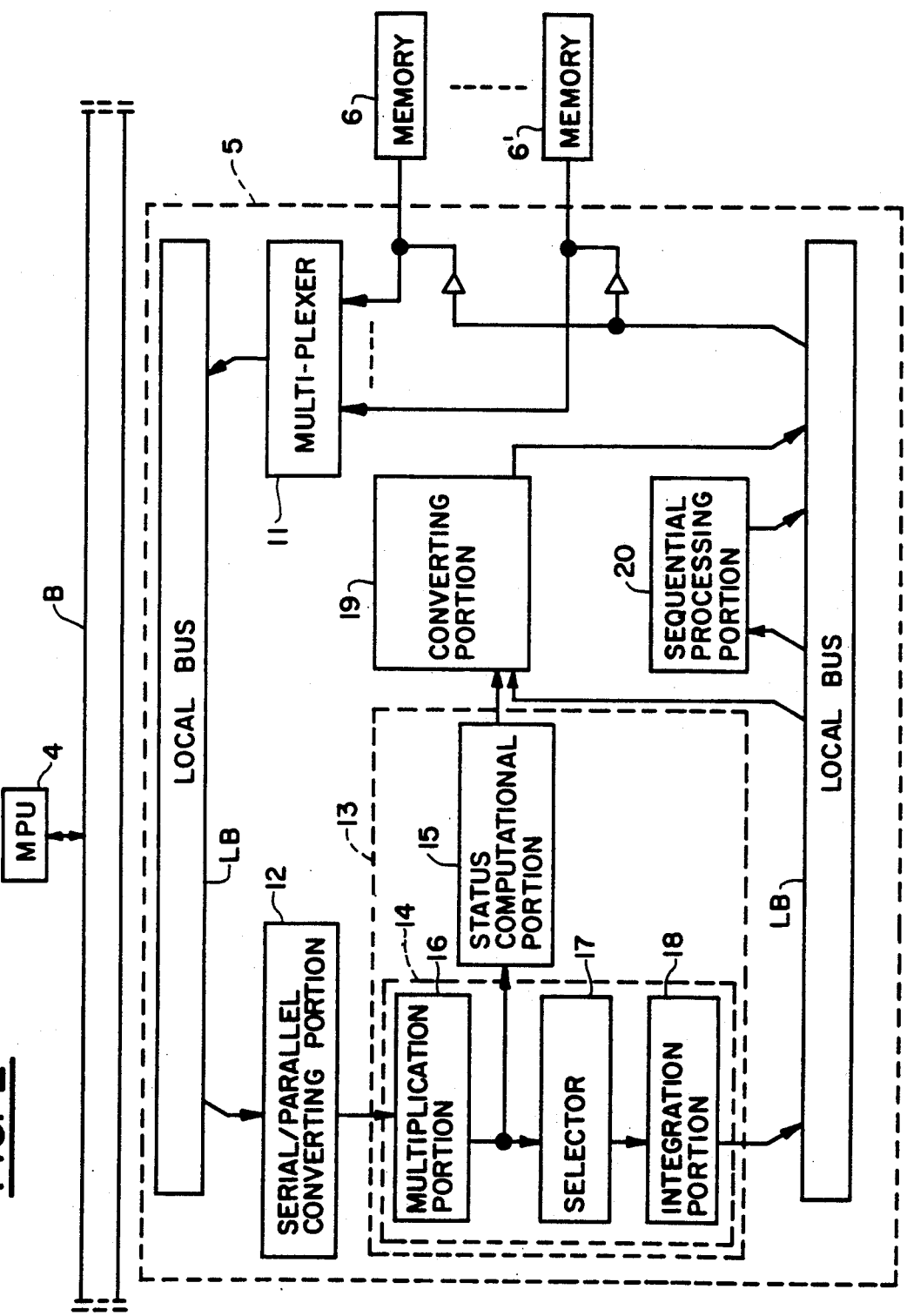
FIG. 2 is a block diagram of a characteristics processing portion of the above embodiment.

FIG. 2 shows the main processing portion 5 in the characteristic process portion. The portion 5 transmits data, selectively inputted through a multiplexer 11, through a local bus LB to serial/parallel converter 12. The converter 12 holds data by predetermined bytes, for example several tens of bytes, then inputs the data in parallel to a computational portion 13. The computational portion comprises a numerical computational portion 14 and status computational portion 15.

The parallel data from serial to parallel converter 12 is passed to the numerical computational portion 14. The numerical computational portion 14 comprises a multiplication portion 16, selector 17 and integration portion 18, which are connected successively. The numerical calculation portion 14 processes differentiation operations or any other operations, including calculations between data. In the typical numerical calculation, each power at a moment is multiplied by a multiplier, then the total multiplication results are integrated.

According to inventor's experiences, it never happens that a power level at a moment is multiplied by two or more multipliers of different absolute values in one operation even when the power level at a moment is applied two or more times in one operation. Therefore, the multiplication portion is positioned on the first 10 position of the computational portion 14 so that the number of multiplication kernels is minimized to be same as the number of power levels simultaneously processed.

Multiplication portion 16 consists of a plurality of multiplication kernels. One kernel performs one multiplication of (A×a), so multiplication portion performs a plurality of multiplication simultaneously to calculate (A×a), (B×b), . . . , (N×n) in parallel. A lot of types of multiplication kernels are well-known to those of skill in the art. The number of gates included in the circuits following the multiplication portion 14 such as selector 17 and integration portion 18 is minimized. So the numerical computational portion has maximal performance as well as high processing speed by its minimal circuit size.

A data flow line is provided from within the numerical computational portion to the status computational portion 15.

The status computational portion 15 performs judgments or calculations such as follows:

a) effective characteristics for segmentation such as steep changing point of power;

b) effective characteristics for detecting the middle frame of a phoneme such as frequency, local maximum of power, etc. and other characteristics.

Since the numerical calculation and status calculation are performed in parallel and independently from each other, each circuit for each calculation is efficient and has high processing speed. The output of status computational portion is not only an effective characteristic as it is, but also an effective data for characteristic extraction in the converting portion. The output from the status computational portion 15 is inputted to a converting portion 19 which performs characteristics extraction as well as calculation characteristics value through integration, computation and so forth.

The converting portion 19 comprises a high speed memory such as a static RAM (random access memory) and a light computational portion connected to a branch of an output of the memory. The output of the light computational portion is fed back to an input of the memory. This construction enables high speed processing of recursive calculation, integration, sequential comparison or other complex calculation using a small circuit.

The light computational portion 13 and converting portion 19 output data through a local bus LB for output to one of the frame memories 6.

A sequential processing portion 20 is connected to the local bus LB which executes a sequential processing. The sequential processing portion comprises a line memory and ratchets for holding power level processed data over a predetermined time length including data on the previous signal groups as well as a logical portion for processing each power level referring the processed data in the predetermined time length.

The processing unit 5 extracts various characteristics at a high speed, so an effective characteristic is supplied to the recognition portion 3. When a dual port memory is used for the memory 6, data is read from and written to the memory 6 at a high speed. The characteristic portion 2 is based on an image processing system, which the present inventor filed a patent application No. 07/141,534 in the United States and which is incorporated herein by reference. Since image data is two dimensional, acoustic data can be processed by an image processing system, because acoustic data is one dimensional, which is less complicated than image data.

In practical acoustic processing, the following processes may be performed in the characteristics portion 2.

a) Segmentation Process a-1) Logarithmic power sequence is registered.

Real-time acoustic signal is inputted to the input portion 1 so as to be converted into a logarithmic power sequence by means of an analog circuit. The logarithmic power sequence is then inputted to the memory 6 in the characteristics portion 2.

a-2) Power sequence is smoothed.

Registered acoustic data is smoothed for reducing noisy drops of power as well as for simplifying the following processes. The smoothed data is registered in another memory 6' different than memory 6 where the original data is registered, in order to preserve the original data.

This smoothing process is performed in the processing unit 5 of the characteristics portion. The multiplication portion 16 multiplies acoustic data by "1" for a predetermined time length. The integration portion 18 calculates the mean value of the multiplied data adding all the data and dividing by the number of additions.

a-3) Concavities in the power sequence are detected.

Status computational portion 15 has a function for extracting "drops" in the power sequence. The start point of a drop can be defined as a point where the first data differential of power sequence changes from plus or zero to minus. The end point of the drop can be defined as a point where the 1st state differential of the power sequence changes from plus to zero or minus. The differential can be calculated by numerical calculation portion and is stored in memory 6'. The status computational portion extracts start and end points of drops by converting the differential of power sequence To "+1", "0" and "−1" when the differential has a value of "plus", "0" and "minus" respectively, and by comparing successive two converted values of differential with a registered pattern.

Since the power sequence is already smoothed, concavities deeper than a predetermined depth are usually the border of successive words.

a-4) Middle point of a chord of each concavity is detected.

In order to define the word border identically, the middle point of chord of each concavity is detected. The middle point is defined as the border, hereafter. Processes a-3 and a-4 are processed by means of an MPU.

a-5) Power sequence is divided at each middle point.

According to the process of a-4), the power sequence is divided into words. The division is performed, for example, by registering index points in the original data based on processes a-3) and a-4).

b) Frequency analysis b-1) Histogram of logarithmic power sequence is generated.

The acoustic signal usually consists of phonemes and background noise. For the frequency analysis, an acoustic signal of the phoneme must be extracted. Since the background noise has a lower power level than that of each phoneme, phoneme signals can be extracted by thresholding. The thresholding should be performed with the optimal threshold. The threshold optimization can be performed similarly to the method in image processing, such as "Mode method" of "Discrimination analysis method".

In this case, a histogram is generated for threshold optimization similar to "Mode method".

The histogram is registered in the high speed memory of converting portion 19 in the characteristics portion 5.

b-2) Optimal threshold of power sequence is calculated.

The present inventor filed a patent application No. 07/323,030 in the United States, disclosing a method for performing "Mode method", the contents of which are incorporated herein by reference.

According to the invention, first the density is sorted in the order of number of pixels. For acoustic analysis, number of power levels is sorted according to the number of times the levels occur. In the sorted table, an optimal threshold is found by investigating the following formula.

$$(Na-Nb) \times (Nc-Nb)$$

The investigation is performed by means of b-3) Power sequence is binarized.

The original power sequence is binarized using the optimal threshold calculated in b-2. This binarization is performed by means of the converting portion 19, using this portion as a converting table.

b-4) Binarized power sequence is successively accumulated.

The binarized power sequence is accumulated along time, that is, accumulated value at time T1 equal to accumulated value of binarized power from the beginning to time T1.

This accumulation is performed in the converting portion 19 of the characteristics portion 5, with the light computational portion as an adder for this purpose. A value stored in the high speed memory is added with the new binarized power, then stored again in the high speed memory. The accumulated value for each time is simultaneously stored in the memory 6'.

b-5) Accumulated power sequence is differentiated.

Accumulated values stored in the memory are differentiated so that the frequency at each time is calculated. The differential calculation is performed by serial/parallel converting portion 12 and computational portion 14. In the converting portion 12, power data in a predetermined time length are stored once. The multiplication portion 16 multiplies data at each time by multipliers predetermined for the differentiation. Integration portion performs mainly subtraction for obtaining the differential value. The differential value is the frequency at each time, which is registered in the memory 6' which again is the memory other than the memory where the original data is stored.

b-6) Differential sequence is outputted to the association portion by each segment obtained by the segmentation of a-5.

The differentiated power sequence is outputted from the memory through the local bus LB to the association portion 3.

Figure 3:
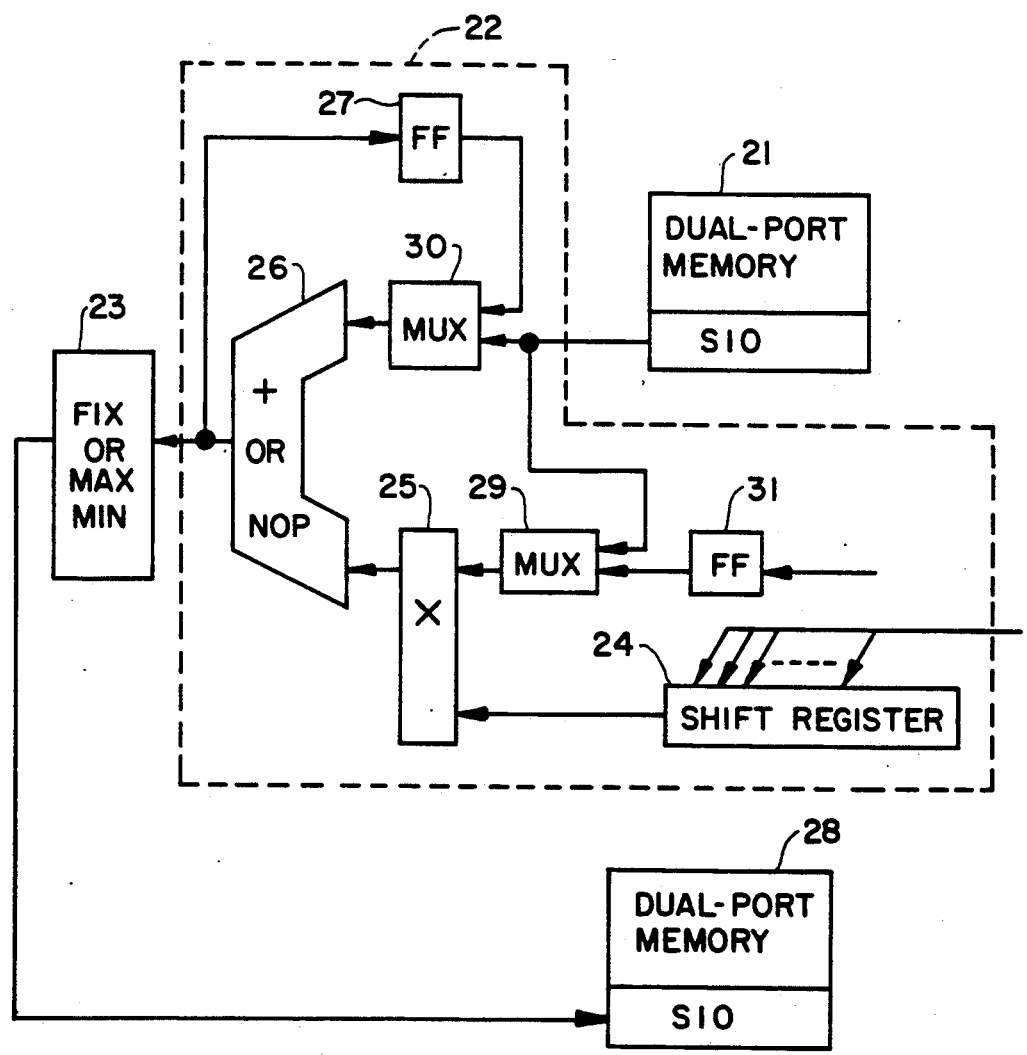
FIG. 3 is a block diagram of an association portion of the above embodiment.

The associative portion 8 of the recognition portion 3 comprises for example a circuit shown in FIG. 3.

In the circuit, a matrix calculation concerning the memory matrix is performed as follows:

$$z = 0\{My\}$$

$$M = xx'$$

where, x: memory stored (lateral vector);
x': transposed matrix of x;
M: memory matrix;
y: transposed matrix of input matrix (lateral vector);
0: quantizing function, which converts positive element of matrix to "1", zero element to "0" and negative element to "−1";
z: associative result (lateral vector)

The recognition portion 3 comprises a dual port memory 21, the serial I/O of which is connected to an associative portion or matrix calculation portion 22. The output of the matrix calculation portion is connected to a quantizing portion 23.

The memory 21 stores a matrix generated by multiplication of x and x'. When x is an-row matrix, the matrix of x·x' becomes an n n matrix. Elements in one row of the matrix is transmitted to the serial access memory (SAM) of the dual port memory 21 in one clock cycle, and each element of the row in the SAM is read from the serial I/O (SIO) in one clock cycle. Therefore, the matrix data in the memory is read out quickly.

The matrix calculation portion 22 has an input portion for association 24 which consists, for example, of a shift register for string input matrix y. Each element of y in the input portion 24 is multiplied by a corresponding element outputted from the SIO, and the multiplication results are integrated by an adder portion 26. For this addition, the adder portion 26 is provided with a holding portion 27 which holds intermediately the integration value and finally the integration result.

The integration result $$M \times y'$$

is inputted to the quantizing portion 23.

The quantizing portion 23 converts each element of $M \times y'$ to "1", "0" or "−1" when the element is positive, zero and negative, respectively. The converted value is stored in the second dual port memory 28.

Figure 4:
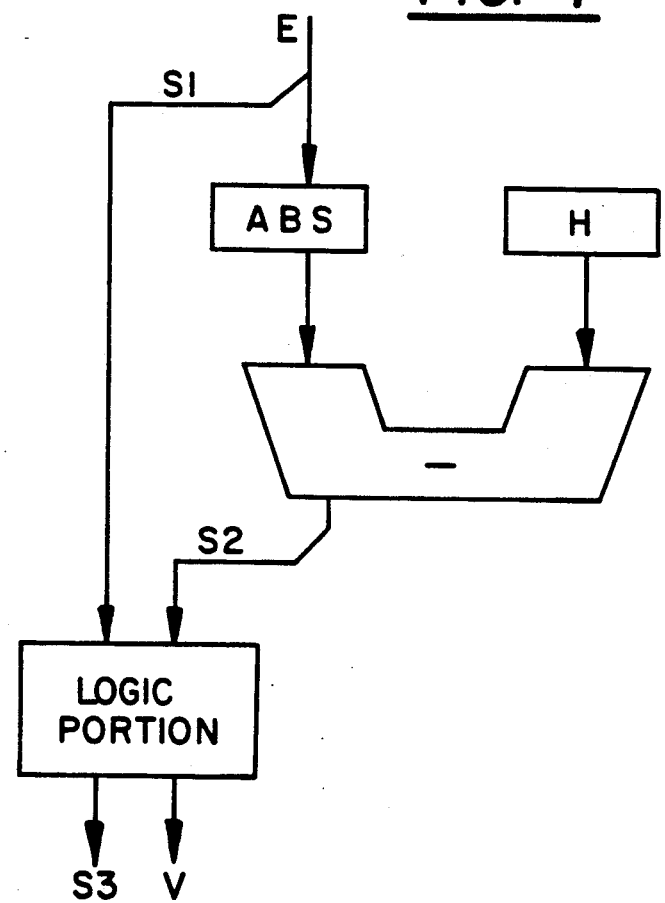
FIG. 4 is a block diagram of a quantizing portion of the above embodiment.

The quantizing portion 23 is constructed, for example, as shown in FIG. 4. An absolute value of a element E is compared with a threshold H so that a comparison result is outputted as a sign flag S2. The sign flag S1 of the element E and the sign flag S2 are inputted to a logic portion then an absolute value V and a sign flag S3 of a quantized value are outputted from the logic portion, according to the calculation below.

$$S3 = S1 \times S2$$

$$V = S2$$

The truth table of the above calculation is as follows:

TABLE 1

| S1 | 0 | 0 | 2 | 1 |
|---|---|---|---|---|
| S2 | 0 | 1 | 0 | 1 |
| S3 | 0 | 0 | 1 | 0 |
| V  | 1 | 0 | 1 | 0 |

The input matrix y is generated by the characteristic processing portion as a characteristic value. When input matrix y has a size of 30×30 elements and each element has a size of 1 byte, the matrix M has a size of 900×900 bytes. Since a ordinary dual port memory has a unit read out time of 40 msec/byte, it takes only $$40 \times 10 - \times 900 \times 900 = 32.4 \text{ msec}$$

for the above matrix calculation.

When a pipe-line construction is applied to the recognition portion, the processing speed is improved. The second dual port memory 28 can be omitted by writing the calculation result in the first memory 21 from which the data for calculation is read out.

The matrix calculation portion 22 further comprises a component for learning, one of the associative portion and learning portion being alternatively selectable by a multiplexer. The multiplication portion 25 is connected with a multiplexer for selecting the serial output or the input pattern, alternatively. The adder portion 26 is connected with a multiplexer for selecting the output of the holding portion 27 or the serial output.

An input pattern for learning is a matrix generated by multiplying the input pattern by a transposed matrix of the input pattern. For calculating one element of the matrix, each element of the vector stored in the shift register 24 is multiplied by one of the elements and all the multiplication results are integrated. The one element as a multiplier is held in a holding portion 31.

The matrix generated by the above calculation is added to the memory matrix M in the adder portion 26.

The quantizing portion 23 can be defined for limitation of a maximum of each element so that when an element after the learning above becomes more than the maximum, the element is converted to the maximum. Without such limitation, a value exceeding the maximum may return to a small value, like a ring counter.

The elements of the memory matrix are improved by a teaching signal given in response to the association result so that the neural network type recognition unit is optimized for an association. It is not necessary to predetermine the association pattern. Any phoneme can be recognized within a limit of the capacity of the recognition portion 8. The recognition portion 5 can learn a user's phoneme patterns so as to be able to recognize a user's voice with high probability.

In the memory 9, elements of the memory matrix and data to be associated are stored; a character code set of Chinese characters may be data to be associated. On association, each element of the memory matrix is transmitted to the dual port memory 21 of the associative portion 8. When the data is a character code set or phonetic code set, the character can be directly designated. It is also possible to convert the output of the associative portion 8 by a converting portion 10 to a character code.

The construction of the associative portion 8 is not limited by the construction above. A connection machine or any other neural network can be applied. However, considering the current semiconductor technology, a matrix calculation type neural network is practical.

The characteristics process portion can be changed to any high speed processing means for extracting various characteristics.

Although only a few exemplary embodiments of this invention have been described in detail above, those skilled in the art will readily appreciate that many modifications are possible in the exemplary embodiments without materially departing from the novel teachings and advantages of this invention.

Accordingly, all such modification are intended to be included within the scope of this invention as defined in the following claims.

What is claimed is:

1. An acoustic recognition method for an acoustic signal which has a contour including concave areas having lower power, and peak areas having higher power, comprising the steps of:
    an acoustic segmentation step where a depth of each said concave of a contour, which is an area that has a power which is lower than other power of said acoustic power sequence, of an acoustic power sequence;
    determining each concavity which has a depth from its opening to its bottom that is greater than a predetermined value as a phoneme boundary;
    binarizing said acoustic power sequence between phoneme boundaries to generate a binarized power sequence;
    calculating an accumulation value of said binarized power sequence by accumulating said power sequence over a predetermined time within said phoneme boundaries;
    calculating a differential of said accumulation value; and
    recognizing a phoneme of said acoustic power sequence by comparing said differential with a plurality of references and outputting a matched reference.

2. A method as in claim 1 comprising the additional steps of, prior to said acoustic segmentation step;
    calculating mean values of lengths of the acoustic power sequence;
    determining noisy drops in each said length; and
    replacing, prior to said segmentation step, said noisy drops with said means values for said each length.

3. A method as in claim 1 further comprising the step of, prior to said recognizing step, providing an input pattern for learning by multiplying an input pattern by a transposed matrix of the input pattern.

4. A method as in claim 3 comprising the further step of limiting a maximum of a result of said multiplying.

5. A method as in claim 1, wherein said concavity is calculated by determining a data differential of the power sequence.

6. A method as in claim 1 further comprising the steps of;
    calculating mean values of lengths of the acoustic signal prior to said acoustic segmentation sequence;
    determining noisy drops in each said length; and
    replacing, prior to said segmentation step, said noisy drops with said means values for said each length.

7. An acoustic recognition system comprising:
    an input portion for generating a digital data in response to an inputted analog acoustic signal;
    a serial/parallel converting portion for holding said digital data from said input portion, and for outputting a parallel data corresponding to said data from said input portion;
    a converting portion comprising a) a memory, b) a light computational portion connected between an output and an input of said memory and c) means for using said parallel data to access a table in said memory which stores binary values corresponding to said parallel data and reading out binary values corresponding to said parallel data, said light computational portion including an adder for adding a current value stored in said memory with currently read out binary values, as well as for feeding an additional result back to said memory to obtained an accumulation of said binary values, and means for recognizing said inputted acoustic signal by comparing said accumulation with a plurality of reference accumulations and outputting a matched reference.

8. An acoustic recognition system as claimed in claim 7, wherein said input portion outputs a logarithmic digital data in response to said inputted analog acoustic signal.

9. A recognition method for an acoustic signal comprising the steps of:

generating a multi-level power sequence indicative of the acoustic signal;

segmenting the multi-level power sequence into phonemes;

generating a binary-level power sequence from the multi-level power sequence;

calculating a series of accumulated values of the binary level power sequence, each of said series corresponding to a phoneme;

calculating a series of derivative values of the series of accumulated values of the binary level power sequence;

associated the series of derivative values with reference patterns to recognize the acoustic signal;

calculating mean values of lengths of the multi-level power sequence;

determining noisy drops in the lengths; and replacing, prior to said segmenting step, noisy drops in the power sequence with said means values.

10. A method as in claim 9 wherein the multi-level power sequence is a logarithmic power sequence.

11. A recognition method for an acoustic signal comprising the steps of:

generating a multi-level power sequence indicative of the acoustic signal;

segmenting the multi-level power sequence into phonemes;

generating a binary-level power sequence from the multi-level power sequence corresponding to a phoneme;

calculating a series of accumulated values of the binary level power sequence, each of said series corresponding to a phoneme;

calculating a series of derivative values of the series of accumulated values of the binary level power sequence; and associating the series of derivative values with reference patterns to recognize the acoustic signal and output a recognized reference pattern;

wherein the step of segmenting the multi-level power sequence further comprises the steps of:

detecting concavities in the contour of the multi-level power sequence;

measuring a depth of the concavities; and designating a concavity which has a depth greater than a threshold as a phoneme boundary.

12. A method as in claim 11, wherein said concavity is calculated by determining a data differential of the power sequence.

13. A recognition apparatus for an acoustic signal comprising:

input means for generating a multi-level power sequence from the acoustic signal;

means for deriving data from the multi-level power sequence;

memory means connected to the input means for storing the multi-level power sequence and said data derived from the multi-level power sequence;

first processing means connected to the memory means for segmenting the multi-level power sequence into phonemes which are stored in said memory means;

second processing means connected to the memory means for generating a binary-level power sequence for each of said phonemes, and for calculating a series of accumulated values of each binary-level power sequence, and for generating a series of derivative values of the series of accumulated values and storing said series in said memory means; and recognition means connected to the memory means for associating the series of derivative values of each phoneme with reference patterns to recognize the acoustic signal and output a recognized reference pattern, wherein said input means comprises smoothing means connected to the memory means, for calculating mean values of lengths of the power sequence and for replacing noisy drops in the power sequence with said mean values to provide an improved-noise signal to said first and second processing means.

14. A recognition apparatus for an acoustic signal comprising:

input means for generating a multi-level power sequence from the acoustic signal;

means for deriving data from the multi-level power sequence;

memory means connected to the input means for storing the multi-level power sequence and said data derived from the multi-level power sequence;

first processing means connected to the memory means for segmenting the multi-level power sequence into phonemes which are stored in said memory means;

second processing means connected to the memory means for generating a binary-level power sequence for each of said phonemes, and for calculating a series of accumulated values of each binary-level power sequence, and for generating a series of derivative values of the series of accumulated values and storing said series in said memory means; and recognition means connected to the memory means for associating the series of derivative values of each phoneme with reference patterns to recognize the acoustic signal and output a recognized reference pattern;

wherein said second processing means includes a converting portion for generating a histogram of the power sequence, obtaining an optimal threshold from said histogram and determining powers which exceed said optimal threshold, for converting parts of the multi-level power sequence that exceed said optimal threshold into the binary level power sequence, and for generating the series of accumulated values of the binary level power sequence.

15. An apparatus as in claim 14 wherein the input means generates a logarithmic power sequence.

16. An apparatus as in claim 15 wherein said second processing means further includes a computational portion for generating a series of derivative values of the series of accumulated values.

17. An apparatus as in claim 14 wherein said recognition means includes matrix multiplication means comprising:
- a first dual-port memory for storing an input matrix derived from the series of derivative values;
- a second dual-port memory for storing a reference matrix, with which the input matrix is to be associated;
- a multiplier for multiplying elements of the input matrix with elements of the reference matrix; and
- a quantizer for converting positive elements of the input product of the input and reference matrices to a quantized result of "1" and for converting negative elements of the product to a quantized result of "−1" and for determining a match between said input and reference matrices based on said quantized results.

18. An apparatus as in claim 14 wherein said recognition means includes learning means comprising:
- a shift register for storing, as an input vector, a series of derivative values formed from the multi-level power sequence;
- means for obtaining a transpose of the input vector;
- an element register for storing one element of the input vector;
- a multiplier for generating as a reference matrix, elements of the product of the input vector with the transpose of the input vector.

* * * * *